United States Patent
Qian

(10) Patent No.: US 10,606,900 B2
(45) Date of Patent: Mar. 31, 2020

(54) INTELLIGENT SEARCHING METHOD AND SYSTEM BASED ON MOBILE DEVICE

(71) Applicant: HUIZHOU TCL MOBILE COMMUNICATION CO., LTD., Huizhou, Guangdong (CN)

(72) Inventor: Wen Qian, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 222 days.

(21) Appl. No.: 15/327,533

(22) PCT Filed: Jul. 6, 2016

(86) PCT No.: PCT/CN2016/088816
§ 371 (c)(1),
(2) Date: Jan. 19, 2017

(87) PCT Pub. No.: WO2017/063396
PCT Pub. Date: Apr. 20, 2017

(65) Prior Publication Data
US 2017/0316112 A1    Nov. 2, 2017

(30) Foreign Application Priority Data
Oct. 16, 2015   (CN) .......................... 2015 1 0667787

(51) Int. Cl.
*G06F 17/30* (2006.01)
*G06F 16/9038* (2019.01)
(Continued)

(52) U.S. Cl.
CPC ............ *G06F 16/9038* (2019.01); *G06F 7/08* (2013.01); *G06F 16/90348* (2019.01);
(Continued)

(58) Field of Classification Search
CPC .................... G06F 17/3064; G06F 17/3097
See application file for complete search history.

(56) References Cited

U.S. PATENT DOCUMENTS

2010/0306191 A1   12/2010   Lebeau
2012/0023097 A1    1/2012   Lebeau
(Continued)

FOREIGN PATENT DOCUMENTS

CN     101465990 A     6/2009
CN     102483753 A     5/2012
(Continued)

OTHER PUBLICATIONS

I Love My Home, The Ultimate Tips of Copy and Paste: Don't Say You Know How to Copy and Paste! , web article, Dec. 30, 2011, All pages, PConline original, China.

*Primary Examiner* — Hung Q Pham

(57) ABSTRACT

An intelligent searching method and system based on a mobile device include acquiring a content and storing the content in a designated folder by a backend, after the mobile device detects that a user operates to duplicate the content; loading contents in the designated folder automatically and displaying the same into a list in a search box by the backend, after a search program in the mobile device is activated; transmitting, by the search program, a broadcast to other applications and performing a search by calling a search function in the applications, when it is detected that one of the contents in the list is selected; displaying an icon or icons of one or more of the applications including the content of the search by the search program, after the search is finished.

8 Claims, 4 Drawing Sheets

(51) Int. Cl.
*G06F 16/903* (2019.01)
*G06F 16/951* (2019.01)
*G06F 7/08* (2006.01)
*G06F 3/0481* (2013.01)
*G06F 3/0482* (2013.01)

(52) U.S. Cl.
CPC .......... *G06F 16/951* (2019.01); *G06F 3/0482* (2013.01); *G06F 3/04817* (2013.01)

(56) References Cited

U.S. PATENT DOCUMENTS

| | | | |
|---|---|---|---|
| 2012/0109923 A1* | 5/2012 | Pasquero | G06F 17/30864 707/706 |
| 2014/0157256 A1* | 6/2014 | Marshall | G06F 21/554 717/178 |
| 2015/0227523 A1 | 8/2015 | LeBeau et al. | |
| 2016/0063115 A1* | 3/2016 | Ayan | G06Q 50/01 707/722 |
| 2016/0098416 A1* | 4/2016 | Li | G06Q 30/0201 707/767 |

FOREIGN PATENT DOCUMENTS

| | | |
|---|---|---|
| CN | 103136342 A | 6/2013 |
| CN | 103648047 A | 3/2014 |
| CN | 104778194 A | 7/2015 |
| CN | 105224674 A | 1/2016 |

\* cited by examiner

INTELLIGENT SEARCHING METHOD AND SYSTEM BASED ON MOBILE DEVICE

CROSS REFERENCE TO RELATED APPLICATIONS

This application claims priority to International Application No. PCT/CN2016/088816, filed on Jul. 6, 2016, which claims priority to Chinese Application No. 201510667787.1, filed on Oct. 16, 2015 and titled "INTELLIGENT SEARCHING METHOD AND SYSTEM BASED ON MOBILE DEVICE". The entire disclosures of the above applications are incorporated herein by reference.

BACKGROUND

Field

The present disclosure relates to technology field of mobile devices, and more particularly to an intelligent searching method and system based on a mobile device.

Background

Now, when browsing information from a mobile device, a user searches a content in which the user is interested in for a second time. The content is usually searched via applications (i.e., searched within the applications with different functions). For example, when browsing an interesting content from a webpage in a browser or in a short message of a mobile phone, the user intends to have a further search in any other applications (e.g., querying a price on TAOBAO or querying whether there is group buying information on other group buying websites). At this time, a scene of searching across the applications appears. However, search portals in the conventional mobile device can search via only one application.

Consequently, the prior art should be improved and enhanced.

DISCLOSURE OF THE INVENTION

Technical Problems

Based on the above-mentioned deficiencies in the prior art, an objective of the present invention is to provide an intelligent searching method and system based on a mobile device aiming to solve detects that when a user browses an interesting content and needs to search the content, search portals in a conventional mobile device can search via only one application and the content cannot be searched across the applications.

Solutions to the Problems

Technical Solutions

Technical schemes of the present invention are described as follows.

An intelligent searching method based on a mobile device, wherein the method comprises:

A1, acquiring a content and storing the content in a designated folder by a backend after the mobile device detects that a user operates to duplicate content;

B1, loading content in the designated folder automatically and displaying the same into a list by the backend, after a search program in the mobile device is activated;

C1, transmitting, by the search program, a broadcast to other applications and performing a search by calling a search function in the applications, when it is detected that one of the contents in the list is selected;

D1, displaying an icon or icons of one or more of the applications including the content of the search by the search program, after the search is finished; and E1, linking to a result page of the search of a corresponding one of the applications, after detecting a clicking operation of the icon of the corresponding one of the applications.

Before step B1, the method further comprises:

R1, scanning the applications in the current mobile device every day and detecting whether the applications include one or more search portals by the search program in the mobile device; and S1, linking the one or more search portals to a main search portal in the mobile device if there is the one or more search portals.

Step B1 specifically comprises:

Loading the contents in the designated folder automatically by the backend, after the search program in the mobile device receives and executes a command from the user;

Sorting the contents, which are automatically loaded in the designated folder by the backend, by time in sequential order; and Displaying the sorted contents in the search box of the search program in the mobile device in the list.

An intelligent searching method based on a mobile device, wherein the method comprises:

A2, acquiring a content and storing the content in a designated folder by a backend after the mobile device detects that a user operates to duplicate the content;

B2, loading contents in the designated folder automatically and displaying the same into a list by the backend after a search program in the mobile device is activated;

C2, transmitting, by the search program, a broadcast to other applications and performing a search by calling a search function in the applications, when detecting that one of the contents in the list is selected; and D2, displaying an icon or icons of one or more of the applications which include the content of the search by the search program, after the search is finished.

Before step A2, the method further comprises:

T2, setting up one or more links between a main search portal in the search program and one or more search portals in the applications in the mobile device in advance.

Before step D2, the method further comprises:

E2, linking to a result page of the search in a corresponding one of the applications, after detecting a clicking operation of the icon of the corresponding one of the applications.

Before step B2, the method further comprises:

R2, scanning the applications in the current mobile device every day and detecting whether the applications include the one or more search portals by the search program in the mobile device; and S2, linking the one or more search portals to the main search portal in the mobile device if there is the one or more search portals.

Step B2 specifically comprises:

Loading the contents in the designated folder automatically by the backend, after the search program in the mobile device receives and executes a command from the user;

Sorting the contents, which are automatically loaded in the designated folder by the backend, by time in sequential order; and Displaying the sorted contents in the search box of the search program in the mobile device in the list.

Before step B2, the method further comprises:

R2, scanning the applications in the current mobile device every day and detecting whether the applications include the one or more search portals by the search program in the mobile device; and S2, linking the one or more search portals to the main search portal in the mobile device if there is the one or more search portals.

An intelligent searching system based on a mobile device, wherein the system comprises:

A detecting and storing module configured to acquire a content from a backend and to store the content in a designated folder, after the mobile device detects that a user operates to duplicate the content;

A content downloading and displaying module configured to automatically load contents in the designated folder with the backend and to display the same into a list, after a search program in the mobile device is activated;

A calling and searching module configured to transmit a broadcast to other applications with the search program and to perform a search by calling a search function in the applications, when it is detected that one of the contents in the list is selected; and A displaying module configured to display an icon or icons of one or more of the applications which include the content of the search with the search program, after the search is finished.

The system further comprises:

A presetting module configured to set up one or more links between a main search portal in the search program and one or more search portals of the applications in the mobile device in advance.

The system further comprises:

A link unit module configured to link to a result page of the search of a corresponding one of the applications, after a clicking operation of the icon of the corresponding one of the applications is detected.

The system further comprises:

A scanning module configured to scan the applications in the current mobile device every day and to detect whether the applications include the one or more search portals with the search program in the mobile device; and A linking module configured to link to the one or more search portals to the main search portal in the mobile device.

The content downloading and displaying module specifically comprises:

A content loading unit configured to automatically load the contents in the designated folder with the backend, after the search program in the mobile device receives and executes a command from the user;

A sorting unit configured to sort the contents, which are automatically loaded in the designated folder by the backend, by time in sequential order; and A displaying unit configured to display the sorted contents in the search box of the search program in the mobile device in the list.

The system further comprises:

A scanning module configured to scan the applications in the current mobile device every day and to detect whether the applications include the one or more search portals with the search program in the mobile device; and A linking module configured to link the one or more search portals to the main search portal in the mobile device.

Advantageous Effects of the Invention

Advantageous Effects

An objective of the present invention is to provide an intelligent searching method and system based on a mobile device aiming to solve defects that when a user browses an interesting content and needs to search the content, search portals in a conventional mobile device can search via only one application and the content cannot be searched across the applications.

BRIEF DESCRIPTION OF THE DRAWINGS

Description of the Drawings

Figure 1:
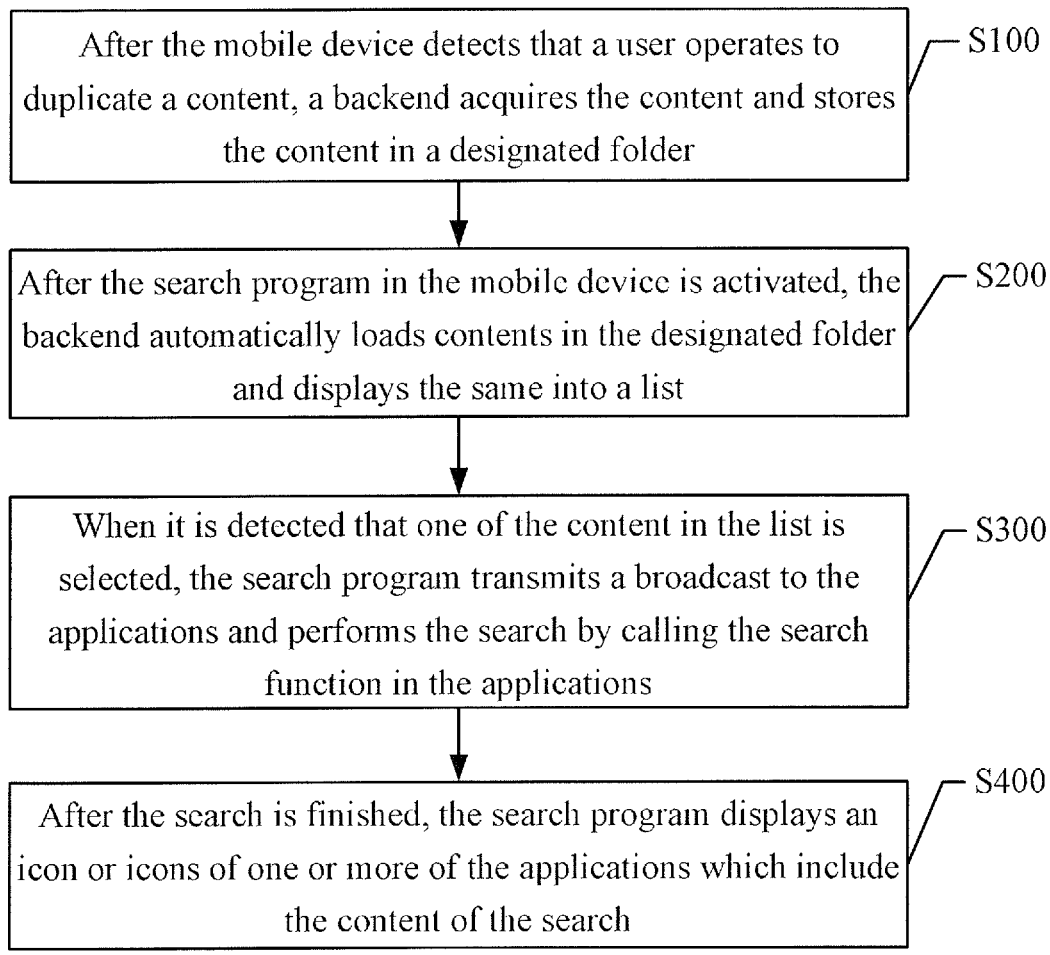

FIG. 1 is a flowchart of an intelligent searching method based on a mobile device in accordance with a preferred embodiment of the present invention.

Figure 2:
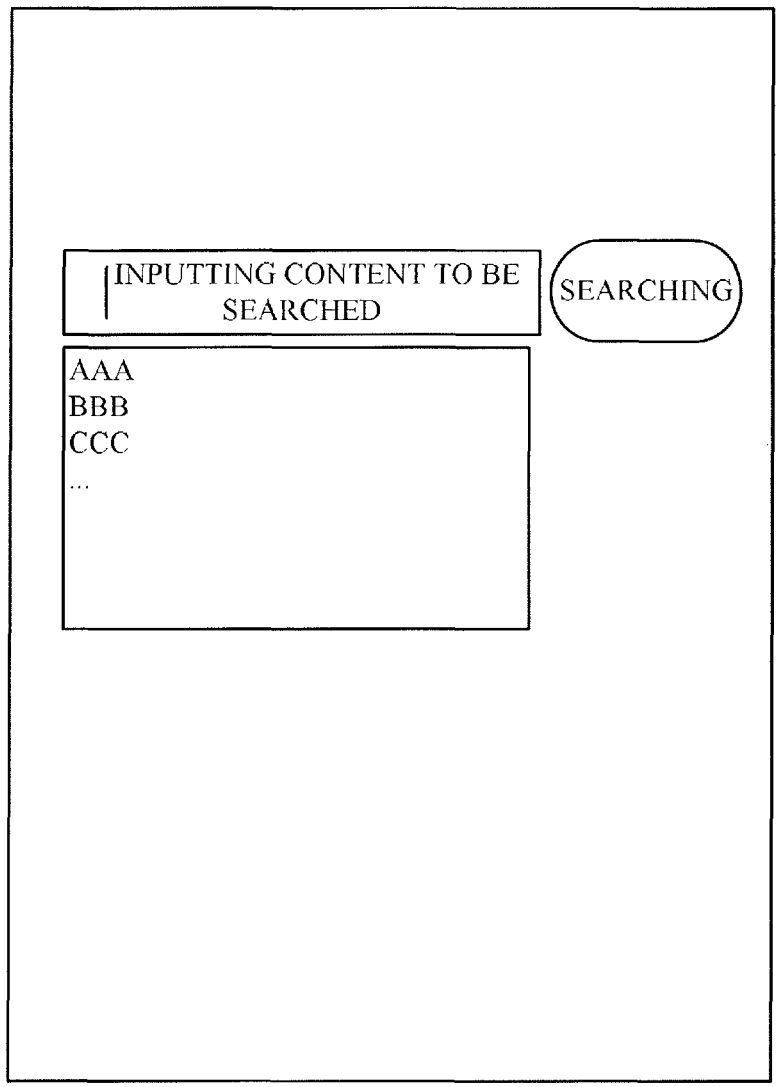

FIG. 2 is a frontend interface of an intelligent searching method based on a mobile device in accordance with a specific embodiment of the present invention before a search is performed.

Figure 3:
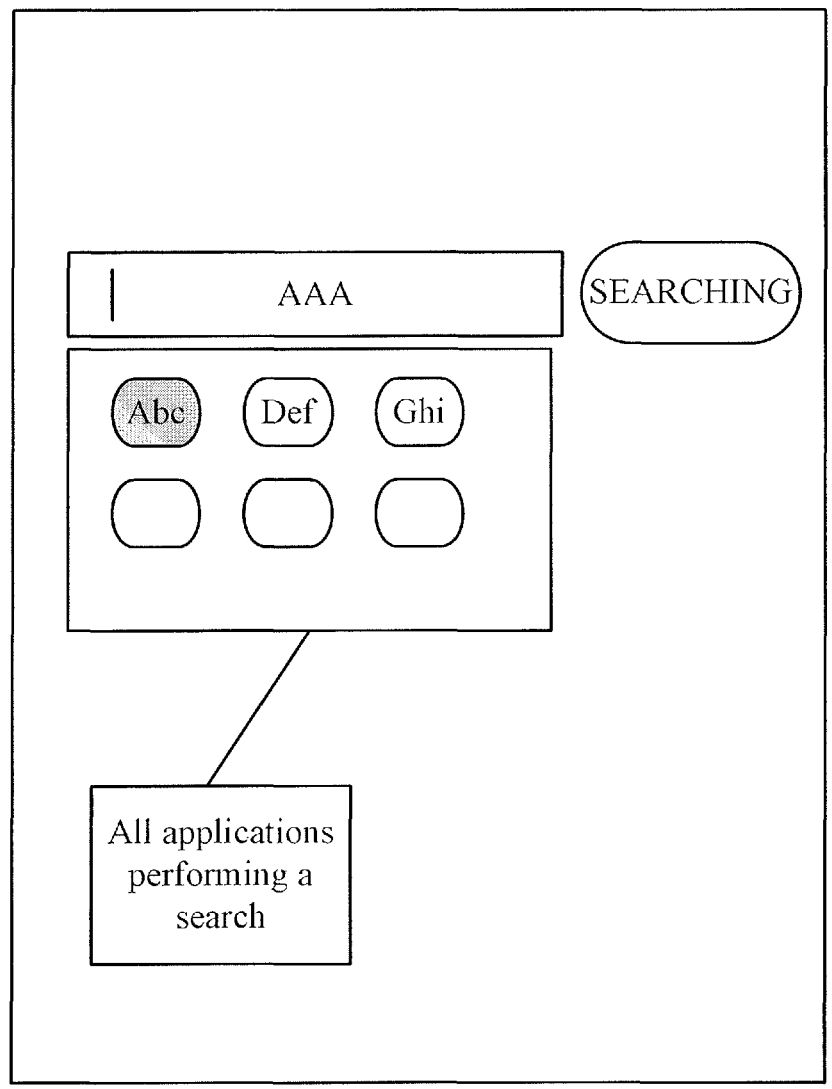

FIG. 3 is a frontend interface of the intelligent searching method based on the mobile device in accordance with a specific embodiment of the present invention after the search is performed.

Figure 4:
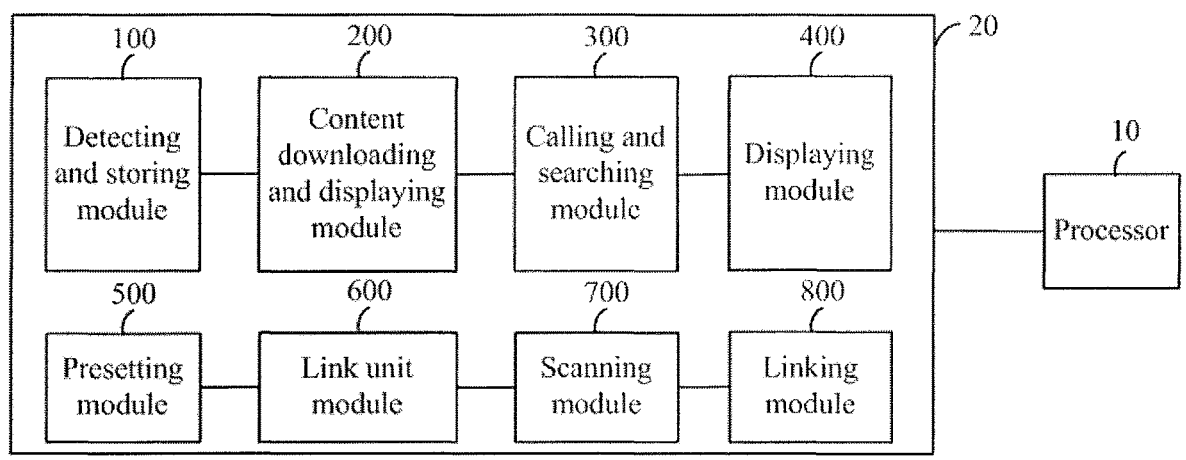
Figure 5:
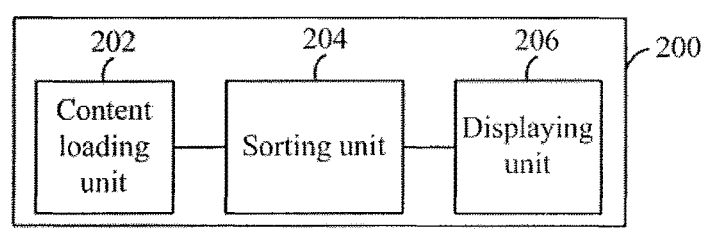

FIG. 4 is a functional principle block diagram of an intelligent searching system based on a mobile device in accordance with a preferred embodiment of the present invention, and FIG. 5 is a functional principle block diagram of a downloading and displaying module in accordance with a preferred embodiment of the present invention.

BEST EMBODIMENT FOR CARRYING OUT THE INVENTION

Best Mode for Carrying Out the Invention

To make the objectives, technical schemes, and technical effects of the present invention more clear and definite, the present invention will be described in details below by using embodiments in conjunction with the appending drawings. It should be understood that the specific embodiments described herein are merely for explaining the present invention and are not intended to limit the present invention.

The present invention provides a flowchart of an intelligent searching method based on a mobile device in accordance with a preferred embodiment of the present invention. As shown in FIG. 1, the method includes the following steps.

In step S100, after the mobile device detects that a user operates to duplicate a content, a backend acquires the content and stores the content in a designated folder.

In a specific implementation, the user duplicates an interesting content when browsing the interesting content in the mobile terminal. The mobile terminal records the content duplicated by the user in the backend. The backend creates a new folder for storing contents duplicated by the user. When the user performs a duplication operation each time, the duplicated content is recorded in the designated folder synchronously.

In a specific implementation, the method further includes the following step before step S100.

In step S10, one or more links between a main search portal in a search program and one or more search portals in applications in the mobile device are set up in advance.

In a specific implementation, in order for the user to search across the applications in the mobile device, it is required to set up the links between the main search portal in the search program and the one or more search portals in the applications in the mobile device, so that the search can be guided from the main search portal to applications in the mobile device.

In step S200, after the search program in the mobile device is activated, the backend automatically loads contents in the designated folder and displays the same into a list.

In a specific implementation, when it is detected that the user clicks the search box of the search program, the backend automatically loads the contents in the designated folder and sorts by time from new to old in the list.

Further, step S200 specifically includes the following steps.

In step S201, when the search program in the mobile device receives and executes a command from the user, the backend automatically loads the contents in the designated folder.

In step S202, the backend sorts the contents, which are automatically loaded in the designated folder, by time in sequential order.

In step S203, the sorted contents are displayed in the search box of the search program in the mobile device in the list.

In a specific implementation, when the user clicks the search box of the search program, records of contents which were duplicated by the user are displayed. The contents which were duplicated before are sorted by time in sequential order. The user can select to only retain a record of a latest duplication. As shown in FIG. 2, when the user clicks the search box, AAA, BBB, CCC, and so on are displayed below the search box in the list from top to bottom. AAA, BBB, CCC, and so on are contents which were duplicated in the designated folder by the user before. AAA is a content of a latest duplication. The backend transmits a content required to be searched and a command for performing a search to all the applications.

Before the step S200, the method further includes the following steps.

In step S101, the search program in the mobile device scans the applications in the current mobile device every day and detects whether the applications include the one or more search portals.

In step S102, if the one or more search portals exist, the one or more search portals are linked to the main search portal in the mobile device.

In a specific implementation, the search program scans the current applications in the mobile device to check whether the applications have a search function. Meanwhile, the applications have to release search interfaces to the search program, and to authorize to permit the search program to call the search function in the applications.

In step S300, when it is detected that one of the content in the list is selected, the search program transmits a broadcast to the applications and performs the search by calling the search function in the applications.

In a specific implementation, when the user identifies the content in the search list, the search program transmits the content and the command requiring performing the search to the applications. As shown in FIG. 3, when the user selects AAA, the applications performing the search are sorted in alphabetical order. If the applications including AAA are Def, Abc, Ghi, and so on, the applications are sorted below the search box in alphabetical order.

In step S400, after the search is finished, the search program displays an icon or icons of one or more of the applications which include the content of the search.

In a specific implementation, after the search is finished, the search program lists programs which have been searched and displays the icons of the programs.

In a specific implementation, after step S400, the method further includes the following step.

In step S500, after a clicking operation of the icon of a corresponding one of the applications is detected, a result page of the search of the corresponding one of the applications is linked.

Specifically, the user clicks the icon to see content of the corresponding one application which corresponds to the content of the current search. For example, the user searches via a mobile phone, which comprises applications of TAOBAO, JINDONG, SUNING, and so on. The user can click according to demand. For example, when TAOBAO is clicked, the mobile phone links to TAOBAO network, so that the user can browse further.

It can be understood from the above-mentioned embodiment of the method that the present invention provides an intelligent searching method based on a mobile device. The mobile device detects contents which are duplicated by a user. A backend stores the duplicated contents in a designated folder. After the user activates a search program, the contents in the folder are automatically loaded and displayed below a search box in sequential order in a list. When it is detected that the user selects a search option, the search is performed across all applications and icons of the searched applications are displayed in a search interface. The user can click an icon of a corresponding one of the applications to link to a search result of the duplicated content of the corresponding application. In the present invention, the contents which are duplicated by the user are stored in the backend. After the user activates the search program, the duplicated contents are automatically loaded. All the applications including the content of the search can be linked to, thereby providing convenience for the user in searching the content rapidly across the applications in the mobile device.

Based on the above-mentioned embodiment of the method, the present invention further provides a functional principle block diagram of an intelligent searching system based on a mobile device in accordance with a preferred embodiment. As shown in FIG. 4, the system includes a processor 10 and a memory 20. The memory 20 includes a plurality of program instructions. The memory 20 is connected with the processor 10. The processor is configured to execute the program instructions stored inside the memory 20. All of the modules 100, 200, 300, 400, 500, 600, 700, and 800 and units 202, 204, and 206 as introduced below, are program instructions executable by the processor 10 to perform corresponding functions. The system includes the following components.

A detecting and storing module 100 is configured to acquire a content with a backend and to store the content in a designated folder, after the mobile device detects that a user operates to duplicate the content. A specific embodiment is mentioned above.

A content downloading and displaying module 200 is configured to automatically load contents in the designated folder with the backend and to display the same into a list, after a search program in the mobile device is activated. A specific embodiment is mentioned above.

A calling and searching module 300 is configured to transmit a broadcast to other applications with the search program and to perform a search by calling a search function in the applications, when it is detected that one of the contents in the list is selected. A specific embodiment is mentioned above.

A displaying module 400 is configured to display an icon or icons of one or more of the applications which include the content of the search with the search program, after the search is finished. A specific embodiment is mentioned above.

The intelligent searching system based on the mobile device further includes the following module.

A presetting module 500 is configured to set up one or more links between a main search portal in the search program and one or more search portals of the applications in the mobile device. A specific embodiment is mentioned above.

The intelligent searching system based on the mobile device further includes the following module.

A link unit module 600 is configured to link to a result page of the search of a corresponding one of the applications, after a clicking operation of the icon of the corresponding one of the applications is detected. A specific embodiment is mentioned above.

In the intelligent searching system based on the mobile device, the content downloading and displaying module 200 specifically includes the following units as shown in FIG. 5.

A content loading unit 202 is configured to automatically load the contents in the designated folder with the backend, after the search program in the mobile device receives and executes a command from the user. A specific embodiment is mentioned above.

A sorting unit 204 is configured to sort the contents, which are automatically loaded in the designated folder by the backend, by time in sequential order. A specific embodiment is mentioned above.

A displaying unit 206 is configured to display the sorted contents in the search box of the search program in the mobile device in the list. A specific embodiment is mentioned above.

The intelligent searching system based on the mobile device further includes the following modules.

A scanning module 700 is configured to scan the applications in the current mobile device every day with the search program in the mobile device and to detect whether the applications include the one or more search portals with the search program in the mobile device. A specific embodiment is mentioned above.

A linking module 800 is configured to link the one or more search portals to the main search portal in the mobile device. A specific embodiment is mentioned above.

In summary, the present invention provides an intelligent searching method and system based on a mobile device. The method includes the following steps. The mobile device detects contents which are duplicated by a user. A backend stores the duplicated contents in a designated folder. After the user activates a search program, the contents in the folder are automatically loaded and displayed below a search box in sequential order in a list. When it is detected that one of the contents is selected, the search program transmits a broadcast to other applications and performs the search by calling a search function in the applications. After the search is finished, the search program displays an icon or icons of one or more of the applications which include the content of the search. In the present invention, the contents duplicated by the user are stored in the backend. After the user activates the search program, the duplicated content are automatically loaded, so that all the applications including the content of the search can be linked to, thereby providing convenience for the user in searching the content rapidly across the applications in the mobile device.

It should be understood that applications of the present invention are not limited to the above-mentioned examples. For one skilled in the art, various modifications and changes could be made according to the above-mentioned descriptions. All modifications and changes should fall within the scope of the appended claims of the present invention.

What is claimed is:

1. An intelligent searching method based on a mobile device, comprising:
    acquiring an electronic data content and storing the electronic data content in a designated folder by the mobile device after the mobile device detects that a user operates to duplicate the electronic data content;
    scanning applications in the mobile device at regular intervals by a search program;
    linking, in response to detecting that one or more search portals in the applications exist, the one or more search portals to a main search portal in the mobile device, wherein the applications including the one or more search portals release search interfaces to the search program and authorize to permit the search program to call a search function in the applications;
    loading electronic data contents automatically by the mobile device when it is detected that the user clicks a search box on a display of the mobile device;
    displaying the electronic data contents in the search box in a list on the display;
    broadcasting the selected one of the electronic data contents to the applications in the mobile device, when it is detected that one of the electronic data contents in the list is selected;
    performing a search for the selected one of the electronic data contents within the applications; and
    displaying an icon or icons of one or more of the applications which include the selected one of the electronic data contents on the display,
    wherein the loading the electronic data contents automatically by the mobile device and displaying the electronic data contents in the search box in the list on the display comprises:
    loading the electronic data contents in the designated folder automatically after the search program in the mobile device receives and executes a command from the user;
    sorting the electronic data contents in sequential order by the mobile device; and
    displaying the sorted electronic data contents in the search box in the list on the display, wherein the sorted electronic data contents are duplicated by the user, stored in the designated folder and not typed by the user.

2. The intelligent searching method based on the mobile device of claim 1, after the displaying the icon or icons of the one or more of the applications which include the selected one of the electronic data contents on the display, the method further comprises:
    linking to a result page of a corresponding one of the applications which includes the selected one of the electronic data contents, in response to detecting a clicking operation of the icon of the corresponding one of the applications.

3. The intelligent searching method based on the mobile device of claim 1, further comprising:
    setting up one or more links between the main search portal and the one or more search portals in the applications in the mobile device.

4. The intelligent searching method based on the mobile device of claim 1, wherein the electronic data content and the command requiring performing the search are transmitted to the applications, in response to detecting that the one of the electronic data contents in the list is selected.

5. An intelligent searching system based on a mobile device, comprising:
   at least one processor; and
   a memory connected with the at least one processor, the memory comprising a plurality of program instructions executable by the at least one processor, the program instructions comprising:
   a detecting and storing module configured to cause the at least one processor to acquire an electronic data content and to store the electronic data contents in a designated folder, after the mobile device detects that a user operates to duplicate the electronic data content;
   a scanning module configured to cause the at least one processor to scan applications in the mobile device at regular intervals by a search program in the mobile device;
   a linking module configured to cause the at least one processor to link, in response to detecting that one or more search portals in the applications exist, the one or more search portals to a main search portal in the mobile device, wherein the applications including the one or more search portals release search interfaces to the search program and authorize to permit the search program to call a search function in the applications;
   a content downloading and displaying module configured to cause the at least one processor to automatically load electronic data contents when it is detected that the user clicks a search box on a display of the mobile device, and configured to cause the at least one processor to display the electronic data contents in the search box in a list on the display;
   a calling and searching module configured to cause the at least one processor to broadcast the selected one of the electronic data contents to the applications in the mobile device, when it is detected that one of the electronic data contents in the list is selected, and to configured to cause the at least one processor to perform a search for the selected one of the electronic data contents within the applications; and
   a displaying module configured to cause the at least one processor to display an icon or icons of one or more of the applications which include the selected one of the electronic data contents on the display,
   wherein the electronic data content downloading and displaying module comprises:
   a content loading unit configured to cause the at least one processor to automatically load the electronic data contents in the designated folder after the search program in the mobile device receives and executes a command from the user;
   a sorting unit configured to cause the at least one processor to sort the electronic data contents in sequential order; and
   a displaying unit configured to cause the at least one processor to display the sorted electronic data contents in the search box in the list on the display, wherein the sorted electronic data contents are duplicated by the user, stored in the designated folder and not typed by the user.

6. The intelligent searching system based on the mobile device of claim 5, further comprising:
   a link unit module configured to cause the at least one processor to link to a result page of a corresponding one of the applications which includes the selected one of the electronic data contents, in response to detecting a clicking operation of the icon of the corresponding one of the applications.

7. The intelligent searching system based on the mobile device of claim 5, further comprising:
   a presetting module configured to cause the at least one processor to set up one or more links between the main search portal and the one or more search portals in the applications in the mobile device.

8. The intelligent searching system based on the mobile device of claim 5, wherein the electronic data content and the command requiring performing the search are transmitted to the applications, in response to detecting that the one of the electronic data contents in the list is selected.

* * * * *